United States Patent
Levant

(10) Patent No.: US 11,630,618 B2
(45) Date of Patent: Apr. 18, 2023

(54) CORRECTING REGISTRATION ERRORS IN DIGITAL PRINTING

(71) Applicant: Landa Corporation Ltd., Rehovot (IL)

(72) Inventor: Boris Levant, Rehovot (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 17/683,401

(22) Filed: Mar. 1, 2022

(65) Prior Publication Data

US 2022/0188050 A1 Jun. 16, 2022

Related U.S. Application Data

(63) Continuation of application No. 17/106,245, filed on Nov. 30, 2020, now Pat. No. 11,321,028.

(60) Provisional application No. 62/946,455, filed on Dec. 11, 2019.

(51) Int. Cl.
*G06T 7/00* (2017.01)
*G06F 3/12* (2006.01)

(52) U.S. Cl.
CPC ............ *G06F 3/1234* (2013.01); *G06F 3/121* (2013.01); *G06T 7/0004* (2013.01); *G06T 2207/20081* (2013.01); *G06T 2207/20084* (2013.01); *G06T 2207/30144* (2013.01)

(58) Field of Classification Search
CPC ...... G06F 3/1234; G06F 3/121; G06F 11/006; G06T 7/001; G06T 2207/20081
USPC .................. 358/1.14, 3.26, 1.9, 538; 382/190
See application file for complete search history.

(56) References Cited

U.S. PATENT DOCUMENTS

| | | |
|---|---|---|
| 3,935,055 A | 1/1976 | Carmien |
| 4,204,471 A | 5/1980 | Becker |
| 4,520,048 A | 5/1985 | Ranger |
| 4,792,473 A | 12/1988 | Vitale |
| 4,867,830 A | 9/1989 | Chung |

(Continued)

FOREIGN PATENT DOCUMENTS

| | | |
|---|---|---|
| CN | 1305895 A | 8/2001 |
| CN | 1543404 A | 11/2004 |

(Continued)

OTHER PUBLICATIONS

CN101592896A Machine Translation (by EPO and Google)—published Dec. 2, 2009; Canon KK.

(Continued)

*Primary Examiner* — Jamares Q Washington
(74) *Attorney, Agent, or Firm* — Kligler & Associates Patent Attorneys Ltd

(57) ABSTRACT

A method for correcting an error in image printing, the method includes receiving a reference digital image (RDI). Based on a predefined selection criterion, one or more regions in the RDI that are suitable for use as anchor features for sensing the error, are automatically selected. A digital image (DI) acquired from a printed image of the RDI, is received and the one or more regions are automatically identified in the DI. Based on the anchor features of the DI, the error is automatically estimated in the printed image. A correction that, when applied to the DI, compensates for the estimated error, is calculated. The estimated error is corrected in a subsequent digital image (SDI) to be printed, and the SDI having the corrected error, is printed.

18 Claims, 5 Drawing Sheets

(56) References Cited

U.S. PATENT DOCUMENTS

| | | | |
|---|---|---|---|
| 5,320,214 | A | 6/1994 | Kordis |
| 11,321,028 | B2 | 5/2022 | Levant |
| 2002/0061451 | A1 | 5/2002 | Kita et al. |
| 2003/0103128 | A1 | 6/2003 | Missell et al. |
| 2004/0177779 | A1 | 9/2004 | Steffen et al. |
| 2004/0221943 | A1 | 11/2004 | Yu et al. |
| 2004/0249327 | A1 | 12/2004 | Sendijarevic et al. |
| 2004/0265016 | A1 | 12/2004 | Kitani et al. |
| 2005/0103437 | A1 | 5/2005 | Carroll |
| 2005/0117859 | A1 | 6/2005 | Suzuki et al. |
| 2006/0066704 | A1 | 3/2006 | Nishida |
| 2006/0120740 | A1 | 6/2006 | Yamada et al. |
| 2007/0025740 | A1 | 2/2007 | Katoh et al. |
| 2008/0066277 | A1 | 3/2008 | Colson et al. |
| 2008/0247780 | A1 | 10/2008 | Hara |
| 2009/0073222 | A1 | 3/2009 | Hori |
| 2009/0185204 | A1* | 7/2009 | Wu .................. H04N 1/60 358/1.9 |
| 2010/0035501 | A1 | 2/2010 | Prudhomme et al. |
| 2010/0123752 | A1 | 5/2010 | Eun et al. |
| 2010/0247171 | A1 | 9/2010 | Ono et al. |
| 2011/0069129 | A1 | 3/2011 | Shimizu |
| 2011/0298884 | A1 | 12/2011 | Furuta |
| 2012/0014726 | A1 | 1/2012 | Sekihara et al. |
| 2012/0236100 | A1 | 9/2012 | Toya |
| 2012/0249630 | A1 | 10/2012 | Bugner et al. |
| 2013/0096871 | A1 | 4/2013 | Takahama |
| 2013/0235139 | A1 | 9/2013 | Schnabel et al. |
| 2015/0343797 | A1 | 12/2015 | Song et al. |
| 2016/0083609 | A1 | 3/2016 | Sisler et al. |
| 2016/0378036 | A1 | 12/2016 | Onishi et al. |
| 2018/0149998 | A1 | 5/2018 | Furukawa |
| 2021/0055666 | A1 | 2/2021 | Landa et al. |
| 2022/0153015 | A1 | 5/2022 | Landa et al. |
| 2022/0153048 | A1 | 5/2022 | Landa et al. |
| 2022/0288947 | A1 | 9/2022 | Landa et al. |

FOREIGN PATENT DOCUMENTS

| | | |
|---|---|---|
| CN | 1703326 A | 11/2005 |
| CN | 1961015 A | 5/2007 |
| CN | 101096455 A | 1/2008 |
| CN | 101248146 A | 8/2008 |
| CN | 101592896 A | 12/2009 |
| CN | 101820241 A | 9/2010 |
| CN | 102341249 A | 2/2012 |
| CN | 102529257 A | 7/2012 |
| CN | 102673209 A | 9/2012 |
| CN | 104015415 A | 9/2014 |
| CN | 107879147 A | 4/2018 |
| JP | 48043941 | 12/1973 |
| JP | S63274572 A | 11/1988 |
| JP | H09174646 A | 7/1997 |
| JP | H10130597 A | 5/1998 |
| JP | 2000094660 A | 4/2000 |
| JP | 2000141883 A | 5/2000 |
| JP | 2000190468 A | 7/2000 |
| JP | 2000337464 A | 12/2000 |
| JP | 2003076159 A | 3/2003 |
| JP | 2005224737 A | 8/2005 |
| JP | 2008082820 A | 4/2008 |
| JP | 2009154377 A | 7/2009 |
| JP | 2009227909 A | 10/2009 |
| JP | 2009240925 A | 10/2009 |
| JP | 2009271422 A | 11/2009 |
| JP | 2009279808 A | 12/2009 |
| JP | 2011168024 A | 9/2011 |
| JP | 2013104044 A | 5/2013 |
| JP | 2014008609 A | 1/2014 |
| JP | 2014073675 A | 4/2014 |
| JP | 2015202616 A | 11/2015 |
| JP | 2016074206 A | 5/2016 |
| JP | 2016179678 A | 10/2016 |
| JP | 2017093178 A | 5/2017 |
| JP | 2018017429 A | 2/2018 |
| JP | 2020014350 A | 1/2020 |
| WO | WO-2015026864 A1 | 2/2015 |
| WO | WO-2017208152 A1 | 12/2017 |

OTHER PUBLICATIONS

CN101820241A Machine Translation (by EPO and Google)—published Sep. 1, 2010; Canon KK.
JP2009240925A Machine Translation (by EPO and Google)—published Oct. 22, 2009; Fujifilm Corp.
CN102529257A Machine Translation (by EPO and Google)—published Jul. 4, 2012; Nippon Synthetic Chem Ind.
CN102673209A Machine Translation (by EPO and Google)—published Sep. 19, 2012; Wistron Corp.
CN104015415A Machine Translation (by EPO and Google)—published Sep. 3, 2014; Avery Dennison Corp.
JP2008082820A Machine Translation (by EPO and Google)—published Apr. 10, 2008; Ricoh KK.
CN1305895A Machine Translation (by EPO and Google)—published Aug. 1, 2001; Imaje SA [FR].
CN1543404A Machine Translation (by EPO and Google)—published Nov. 3, 2004; 3M Innovative Properties Co [US].
CN1703326A Machine Translation (by EPO and Google)—published Nov. 30, 2005; Nissha Printing [JP].
JP2003076159A Machine Translation (by EPO and Google)—published Mar. 14, 2003, Ricoh KK.
Co-pending U.S. Appl. No. 17/551,219, filed Dec. 15, 2021.
Co-pending U.S. Appl. No. 17/583,372, inventor Pomerantz; Uriel, filed Jan. 25, 2022.
Co-pending U.S. Appl. No. 17/676,398, filed Mar. 21, 2022.
Co-pending U.S. Appl. No. 17/694,702, filed Mar. 15, 2022.
IP.com Search, 2019, 1 page.
CN101096455A Machine Translation (EPO, PlatPat and Google) published on Jan. 2, 2008 Fujifilm Corp.
CN101248146A Machine Translation (EPO, PlatPat and Google) published on Aug. 20, 2008 Ricoh KK.
CN102341249A Machine Translation (EPO, PlatPat and Google) published on Feb. 1, 2012 Eastman Kodak Co.
CN107879147A Machine Translation (by EPO and Google)—published Apr. 6, 2018; Brother Ind Ltd.
CN1961015A Machine Translation (EPO, PlatPat and Google) published on May 9, 2007 Dainippon Ink & Chemicals.
Co-pending U.S. Appl. No. 17/773,609, inventors Benzion; Landa et al., filed May 1, 2022.
Co-pending U.S. Appl. No. 17/788,335, inventors Benzion; Landa et al., filed Jun. 23, 2022.
Co-pending U.S. Appl. No. 17/842,860, inventor Landa; Benzion, filed Jun. 17, 2022.
Co-pending U.S. Appl. No. 17/894,172, inventors Landa; Benzion et al., filed Aug. 23, 2022.
Co-pending U.S. Appl. No. 17/963,225, inventors Burkatovsky; Vitaly et al., filed Oct. 11, 2022.
JPS63274572A Machine Translation (by EPO and Google)—published Nov. 11, 1988; Canon KK.
JP2000094660A Machine Translation (by EPO and Google)—published Apr. 4, 2000; Brother Ind Ltd.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother Ind Ltd.
JP2000337464A Machine Translation (by EPO and Google)—published Dec. 5, 2000; Fuji Xerox Co Ltd.
JP2004117118A Machine Translation (by EPO and Google)—published Apr. 15, 2004; Nidec Copal Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006: Ricoh Printing Sys Ltd.
JP2009154377A Machine Translation (by EPO and Google)—published Jul. 16, 2009; Fujifilm Corp.

(56) References Cited

OTHER PUBLICATIONS

JP2009227909A Machine Translation (EPO, PlatPat and Google) published on Oct. 8, 2009 Fujifilm Corp.
JP2009271422A Machine Translation (by EPO and Google)—published Nov. 19, 2009; Ricoh KK.
JP2009279808A Machine Translation (by EPO and Google)—published Dec. 3, 2009; Fuji Xerox Co Ltd.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016179678A Machine Translation (EPO, PlatPat and Google) published on Oct. 13, 2016 Xerox Corp.
JP2017093178A Machine Translation (EPO and Google) published on May 25, 2017 Samsung Electronics Co Ltd.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JP48043941 Machine Translation (by EPO and Google)—published Dec. 21, 1973.
JPH10130597A Machine Translation (by EPO and Google)—published May 19, 1998; Sekisui Chemical Co Ltd.

\* cited by examiner

CORRECTING REGISTRATION ERRORS IN DIGITAL PRINTING

CROSS-REFERENCE TO RELATED APPLICATIONS

This application is a Continuation of U.S. patent application Ser. No. 17/106,245, filed Nov. 30, 2020, which claims the benefit of U.S. Provisional Patent Application 62/946,455, filed Dec. 11, 2019.

The disclosures of all these related applications are incorporated herein by reference.

FIELD OF THE INVENTION

The present invention relates generally to digital printing, and particularly to methods and systems for estimating and correcting registration errors in printing of a digital image.

BACKGROUND OF THE INVENTION

Various techniques for correcting registration errors in printing processes have been published.

For example, U.S. Patent Application Publication 2016/0325542 describes a method for registering a printing press including a plurality of printing stations each for printing a respective color-image on a web, each of the printing stations being associated with a respective different color, at least two pairs of the printing stations being un-registered. The method includes the procedures of identifying at least two regions-of-interest in the image to be printed, chromatically separating the acquired image to determine two monochrome images, and determining a registration correction for each printing station according to the registration between the monochrome images.

U.S. Pat. No. 9,503,613 describes methods and devices for print markings on an item in a first printing pass, using intended locations for the markings, to produce initial printed marks. Such methods and devices further scan the item after the first printing pass to detect actual printed locations of the initial printed marks. These methods and devices also compare the actual printed locations to the intended locations to identify the printing registration variation.

U.S. Patent Application Publication 2014/0146370 describes an image registration method to register a target image with a reference image. The method includes determining a target set of features present in the target image, determining a reference set of features present in the reference image, generating respective signatures for each feature in the target and reference sets, matching features from the target set to corresponding features in the reference set using the signatures, generating respective transformations to map pairs of features in the target set to corresponding pairs of features in the reference set, and determining a similarity transformation for the target image using a measure of the accuracy of the transformations.

SUMMARY OF THE INVENTION

An embodiment of the present invention that is described herein provides a method for correcting an error in image printing, the method including receiving a reference digital image (RDI). Based on a predefined selection criterion, one or more regions in the RDI that are suitable for use as anchor features for sensing the error, are selected. A digital image (DI) acquired from a printed image of the RDI, is received and the one or more regions are identified in the DI. Based on the anchor features of the DI, the error is estimated in the printed image. A correction that, when applied to the DI, compensates for the estimated error, is calculated. The estimated error is corrected in a subsequent digital image (SDI) to be printed, and the SDI having the corrected error, is printed.

In some embodiments, the error includes a registration error, and selecting the one or more regions includes producing multiple versions of the RDI having respective registration errors. In other embodiments, producing the multiple versions includes applying to at least part of at least one of the regions, one or more errors selected from a list consisting of: (a) flipping in one or more axes, (b) rotating in one or more axes, (c) image blurring, and (d) adding noise, and selecting the one or more regions includes training a neural network using the multiple versions. In yet other embodiments, estimating the error includes training a neural network to detect the error in the one or more regions, and training the neural network includes producing multiple versions of the RDI having respective errors.

In an embodiment, the error includes a registration error, and training the neural network includes comparing, in a selected region, between a predefined registration error produced in the selected region, and an output registration error estimated by the neural network, and applying, to the predefined and the output registration errors, a loss function, and comparing an output of the loss function to a threshold. In another embodiment, the RDI includes at least a first reference color image (RCI) having a first color, and a second RCI having a second color, and producing the multiple versions includes shifting, in the region, at least part of the first RCI relative to the second RCI. In yet another embodiment, training the neural network includes training a multi-layered convolutional neural network including at least five layers.

In some embodiments, the error includes a registration error, and estimating the registration error includes estimating an image-to-substrate (ITS) registration error by (i) measuring, in the RDI, a distance between at least one of the anchor features and a given region at an edge of the printed image, and (ii) estimating, in the printed image of the DI, a variation of the distance. In other embodiments, the error includes a registration error, each of the RDI and DI includes at least first and second colors, and estimating the registration error includes estimating, in at least one of the regions of the DI, a color-to-color (CTC) registration error between the first and second colors by (i) measuring, in at least one of the regions of the RDI image, a given distance between the first color and the second color, and (ii) estimating, in the printed image of the DI, a variation of the given distance. In yet other embodiments, the error includes at least one of: (a) a shift of a given pattern of the printed image relative to a position of the given pattern in the RDI, (b) a missing pattern, (c) a non-uniform thickness of a pattern in the printed image, (d) a non-uniform width of the pattern in the printed image, (e) a deviation in a profile of one or more colors of the printed image, and (f) a deviation in a linearity of one or more colors of the printed image.

There is additionally provided, in accordance with an embodiment of the present invention, a system for correcting an error in image printing, the system includes a processor and a printing subsystem. The processor is configured to: receive a reference digital image (RDI), select, based on a predefined selection criterion, one or more regions in the RDI that are suitable for use as anchor features for sensing the error, receive a digital image (DI) acquired from a printed image of the RDI, and identify the one or more regions in the DI, estimate, based on the anchor features of the DI, the error in the printed image, calculate a correction that, when applied to the DI, compensates for the estimated error, and correct the estimated error in a subsequent digital image (SDI) to be printed. The printing subsystem is configured to print the SDI having the corrected error.

The present invention will be more fully understood from the following detailed description of the embodiments thereof, taken together with the drawings in which:

DETAILED DESCRIPTION OF EMBODIMENTS

Overview

Figure 1:
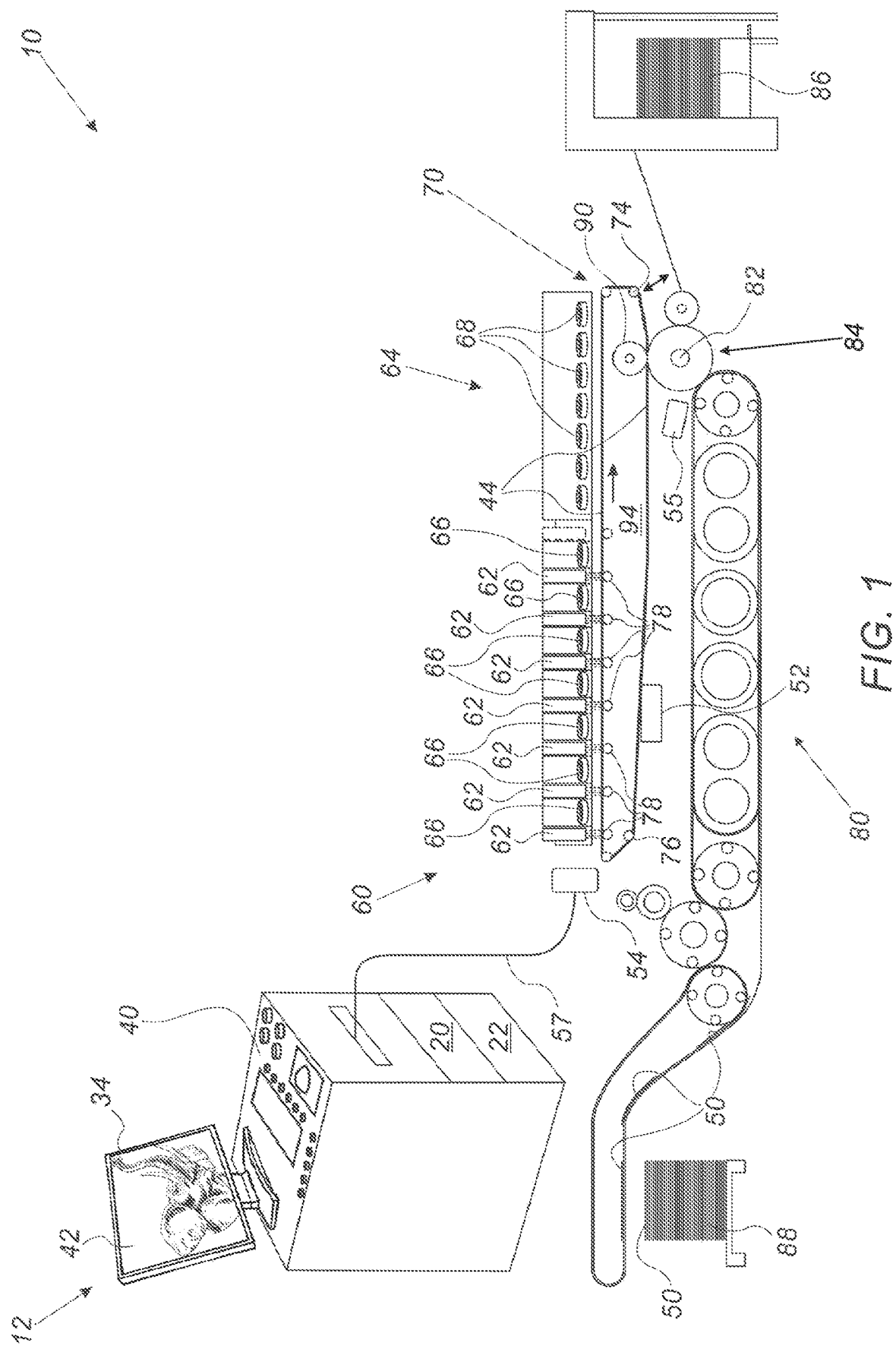
FIG. 1 is a schematic side view of a digital printing system, in accordance with an embodiment of the present invention.

Digital printing processes may cause various types of registration errors in an image printed on a target substrate. In principle, it is possible to implement, in a digital image to be printed, registration targets for measuring registration errors in the printed version of the image. Such registration targets, however, are typically limited to the edge of the target substrate, and therefore, may not be indicative of registration errors within the printed image.

Embodiments of the present invention that are described hereinbelow provide improved techniques for estimating and correcting registration errors in printing of a digital image on a target substrate. In some embodiments, a digital printing system comprises a processor and a printing subsystem.

In some embodiments, the processor is configured to receive a reference digital image (RDI) to be printed using the printing subsystem. The processor is configured to select, based on a predefined selection criterion, one or more regions, also referred to herein as patches, in the RDI that are suitable for use as anchor features for sensing various types of registration errors.

In some embodiments, the processor is configured to receive a digital image (DI) acquired from a printed image of the RDI, to identify the patches in the DI, and to estimate, based on the anchor features of the DI, one or more of the registration errors in the printed image. Subsequently, the processor is configured to calculate a correction that, when applied to the DI, compensates for the estimated registration errors, and to correct the estimated registration error in a subsequent digital image (SDI) to be printed. In some embodiments, the printing subsystem configured to print the SDI having the corrected registration error.

In some embodiments, the system may comprise a multi-layered convolutional neural network (CNN), and the processor is configured to produce multiple versions of the RDI having respective registration errors, referred to herein as ground truth, serving as an input for the CNN. The processor may add to the registration errors, augmented errors, such as rotating, flipping and blurring of at least part of the selected patch and anchor feature. Subsequently, the processor is configured to train the CNN to estimate the registration errors using the ground truth input. Note that the aforementioned augmentation may improve the robustness of the trained CNN.

In some embodiments, the RDI and DIs comprise multiple color images of respective colors, and the registration error comprises a color-to-color (CTC) registration error between at least two of the aforementioned colors, referred to herein as first and second colors. In such embodiments, the processor is configured to apply the CNN to measure, in a selected position of at least one of the patches of the RDI image, a given distance between the first color and the second color, and to estimate, in the printed image of the DI, a variation of the given distance.

In some embodiments, the CNN is configured to receive an input image of a patch having about 10,000 red-green-blue (RGB) pixels, to apply to the input image multiple convolutional layers (e.g., five layers), and to output a fully-connected neural network layer having multiple outputs indicative of the respective registration error of each printed color in x and y axes of the printed image. For example, the printed image may comprise cyan, magenta, yellow and black (CMYK) color images arranged on the target substrate to form the RGB image. In this example, the fully-connected neural network layer may comprise eight outputs, two for each color image.

In some embodiments, during the training of the CNN, the processor is configured to compare between the output of the CNN and the ground truth input, using a loss function. The processor may hold a threshold indicative of the qualification level of the CNN to estimate the registration error in the respective patch. If the output of the loss function is smaller than the threshold, the CNN is qualified for estimating registration errors in the respective patch. Alternatively, if the output of the loss function is larger than the threshold, the processor may train the CNN with additional versions of the respective patch. Note that the training process is iterative, so that the processor may measure the training efficiency by the number of iterations required to qualify the CNN.

The disclosed techniques improve the quality of printed digital images by correcting a large variety of registration errors. Moreover, the disclosed techniques reduce waste of substrate and ink by improving the yield of the printed substrates.

System Description

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84 and a blanket treatment station 52. In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as "an ink image" (not shown) or as an "image" for brevity, of a digital image 42 on an upper run of a surface of blanket 44. Subsequently the ink image is transferred to a target substrate, (e.g., a paper, a folding carton, a multilayered polymer, or any suitable flexible package in a form of sheets or continuous web) located under a lower run of blanket 44.

In the context of the present invention, the term "run" refers to a length or segment of blanket 44 between any two given rollers over which blanket 44 is guided.

In some embodiments, during installation blanket 44 may be adhered edge to edge to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan (C), magenta (M), yellow (Y) and black (K).

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis, also referred to herein as moving direction of blanket 44, represented by an arrow 94. In this configuration, accurate spacing between bars 62, and synchronization between directing the droplets of the ink of each bar 62 and moving blanket 44 are essential for enabling correct placement of the image pattern.

In some embodiments, system 10 comprises heaters, such as hot gas or air blowers 66 and/or infrared (IR) heaters or and other suitable type of heaters adapted for the printing application. In the example of FIG. 1, air blowers 66 are positioned in between print bars 62, and are configured to partially dry the ink droplets deposited on the surface of blanket 44. This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises drying station 64, configured to blow hot air (or another gas) onto the surface of blanket 44. In some embodiments, drying station comprises air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling ITM, such as a blanket 44. In some embodiments, blanket module 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller. Note that in the context of the present invention and in the claims, the terms "indicative of" and "indication" are used interchangeably.

Additionally or alternatively, blanket 44 may comprise an integrated encoder (not shown) for controlling the operation of various modules of system 10. One implementation of the integrated encoder is described in detail, for example, in U.S. Provisional Application 62/689,852, whose disclosure is incorporated herein by reference.

In some embodiments, blanket 44 is guided over rollers 76 and 78 and a powered tensioning roller, also referred to herein as a dancer assembly 74. Dancer assembly 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer assembly 74.

In some embodiments, dancer assembly 74 may be motorized. The configuration and operation of rollers 76 and 78 are described in further detail, for example, in U.S. Patent Application Publication 2017/0008272 and in the above-mentioned PCT International Publication WO 2013/132424, whose disclosures are all incorporated herein by reference.

In some embodiments, system 10 may comprise one or more tension sensors (not shown) disposed at one or more positions along blanket 44. The tension sensors may be integrated in blanket 44 or may comprise sensors external to blanket 44 using any other suitable technique to acquire signals indicative of the mechanical tension applied to blanket 44. In some embodiments, processor 20 and additional controllers of system 10 are configured to receive the signals produced by the tension sensors, so as to monitor the tension applied to blanket 44 and to control the operation of dancer assembly 74.

In impression station 84, blanket 44 passes between an impression cylinder 82 and a pressure cylinder 90, which is configured to carry a compressible blanket.

In some embodiments, system 10 comprises a control console 12, which is configured to control multiple modules of system 10, such as blanket module 70, image forming station 60 located above blanket module 70, and a substrate transport module 80, which is located below blanket module 70 and comprises one or more impression stations as will be described below.

In some embodiments, console 12 comprises a processor 20, typically a general-purpose computer, with suitable front end and interface circuits for interfacing with controllers of dancer assembly 74 and with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and/or various types of test patterns that may be stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52, the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket.

In some embodiments, blanket treatment station 52 may be positioned adjacent to image forming station 60, in addition to or instead of the position of blanket treatment station 52 shown in FIG. 1. In such embodiments, the blanket treatment station may comprise one or more bars, adjacent to print bars 62, and the treatment fluid is applied to blanket 44 by jetting.

In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference.

Additionally or alternatively, treatment fluid may be applied to blanket 44, by jetting, prior to the ink jetting at the image forming station.

In the example of FIG. 1, station 52 is mounted between impression station 84 and image forming station 60, yet, station 52 may be mounted adjacent to blanket 44 at any other or additional one or more suitable locations between impression station 84 and image forming station 60. As described above, station 52 may additionally or alternatively comprise on a bar adjacent to image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two or more impression cylinders so as to permit one or more duplex printing. The configuration of two impression cylinders also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancer assemblies, so as to maintain the upper run taut and to substantially isolate the upper run of blanket 44 from being affected by mechanical vibrations occurring in the lower run.

In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 82, as shown in FIG. 1, or at any other suitable location in system 10.

In some embodiments, station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS) image sensor, and a scanner comprising a slit having a width of about one meter or any other suitable width.

In the context of the present disclosure and in the claims, the terms "about" or "approximately" for any numerical values or ranges indicate a suitable dimensional tolerance that allows the part or collection of components to function for its intended purpose as described herein. For example, "about" or "approximately" may refer to the range of values ±20% of the recited value, e.g. "about 90%" may refer to the range of values from 72% to 100%.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor or controller connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images (and a test pattern if available), so as to monitor various attributes, such as but not limited to full image registration with sheet 50, color-to-color (CTC) registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a "master" or a "source image" of a given digital image and a digital image of the printed version of the given image, which is acquired by the camera.

In other embodiments, processor 20 may apply any suitable type image processing software, e.g., to the printed image, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to analyze the signals acquired by station 55 so as to monitor the nozzles of image forming station 60. By printing the digital image and/or a test pattern of each color of image forming station 60, processor 20 is configured to identify various types of defects indicative of malfunctions in the operation of the respective nozzles.

For example, absence of ink in a designated location in the printed image is indicative of a missing or blocked nozzle. A partially blocked nozzle may result in a distorted pattern. A shift of a printed pattern (relative to the original design) is indicative of inaccurate positioning of a respective print bar 62 or of one or more nozzles of the respective print bar. Non-uniform thickness and/or width of a printed feature of the image is indicative of width differences between respective print bars 62, referred to above as bar to bar width delta.

In some embodiments, processor 20 is configured to detect these defects by comparing between a section of the printed and a respective reference section of the original design, also referred to herein as a master. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Estimating and Correcting Registration Errors in Image Printing

Figure 2:
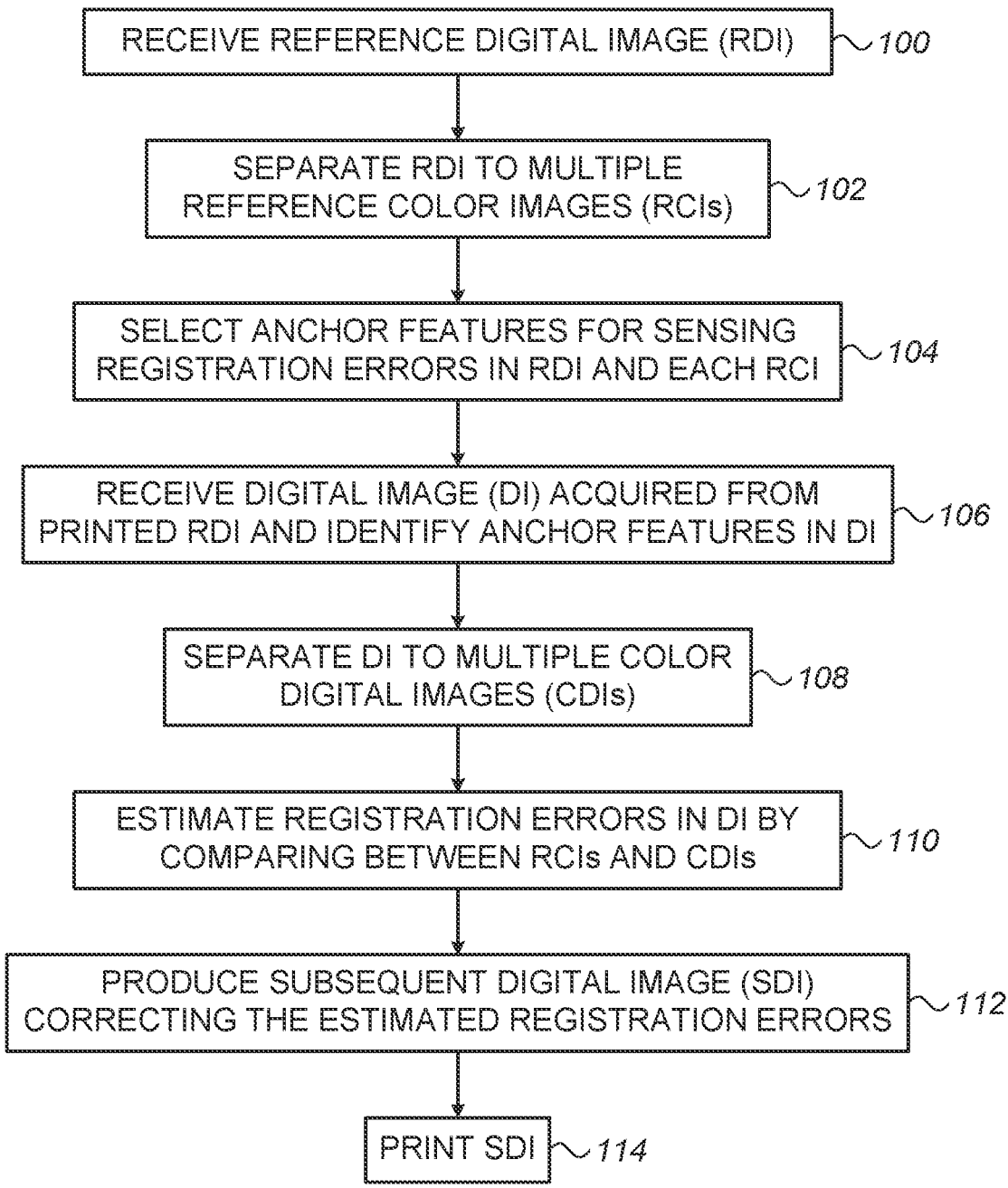
FIG. 2 is a flow chart that schematically shows a method for correcting registration errors in image printing, in accordance with an embodiment of the present invention.

FIG. 2 is a flow chart that schematically shows a method for correcting registration errors in image printing, in accordance with an embodiment of the present invention. For the sake of concreteness and clarity, the method of FIG. 2 is described hereinbelow with reference to the elements of system 10. The principles of this method, however, are not limited to this particular system configuration and can be applied, mutatis mutandis, in other sorts of printing systems (such as, but not limited to digital printing on continuous web substrate) that require detection and compensation of various types of registration errors.

The method begins at a step 100 with processor 20 receiving a reference digital image (RDI) to be printed on blanket 44 and subsequently transferred to sheet 50. Note that the RDI comprises multiple colors. At a step 102, processor 20 separates the RDI to multiple reference color images (RCIs) of the aforementioned colors. Note that the RDI may comprise a red-green-blue (RGB) image. In some embodiments, processor 20 is configured to convert the RGB image into a combination of colors (e.g., CMYK) supplied by system 10, and is further configured to separate the image to multiple (e.g., four) color images of the respective CMYK ink droplets supplied by print bars 62 as described in FIG. 1 above.

At a step 104 processor 20 selects, based on a predefined selection criterion, one or more regions in the RDI and in each RCI, which are suitable for use as candidate anchor features for sensing registration errors in the RDI and RCIs. In the context of the present disclosure and in the claims, the terms "region" and "patch" are used interchangeably and refer to an area in any digital image having one or more anchor features. The predefined selection criterion is further described in FIG. 3 below, and other methods for selecting the region containing anchor images are described in FIGS. 4-6 below.

In other embodiments, processor 20 is configured to select the regions having the anchor features in any type of digital image, such as but not limited to an image acquired from a printed image, or a digital image provided in any suitable format, such as but not limited to PDF file format.

At a step 106, processor 20 receives, e.g., from image quality control station 55, a digital image (DI) acquired from an image of the RDI, which is printed by system 10, and identifies in the DI, the one or more regions having the anchor features.

At a step 108, processor 20 separates the DI to multiple color digital images (CDIs) corresponding to the RCIs described in step 102 above. Note that step 108 may be used primarily for detecting color-to-color (CTC) registration errors as will be described in detail in FIGS. 4-6 below. In some embodiments, such as when only detection of an image-to-substrate (ITS) registration error is of interest, step 108 may be removed from the method. In other embodiments, step 108 may also be used for detecting ITS registration errors.

At a step 110, processor 20 may estimate, based on the anchor features of the DI, one or more registration errors, such as ITS, CTC and others, in the image printed by system 10. In some embodiments, processor 20 is configured to estimate the registration errors in the DI by comparing between the RCIs and the CDIs, or by comparing between the RDI and the DI.

In some embodiments, processor 20 is configured to estimate the ITS registration error by conducting measurements on the RDI and on the DI. In such embodiments, processor 20 is configured to measure, in the RDI, distances between one or more of the anchor features and a given region at an edge of the printed image. For example, the given region may be located at or constitute a corner of sheet 50. Subsequently, processor 20 is configured to measure, in the printed image of the DI, a variation of the distances that were measured in the RDI, between the anchor features and a given region. The estimation of registration errors is further described in FIG. 3 below.

At a step 112, processor 20 produces a subsequent digital image (SDI), which is based on the RDI and is correcting the registration errors estimated in the DI, as described in step 110 above.

At a step 114, processor 20 controls system 10 to print the SDI image. In some embodiments, after step 114 the method may loop back to step 106 in an iterative process for detecting whether or not the registration errors have been properly corrected. In such embodiments, at step 106 processor may receive, e.g., from image quality control station 55, a revised DI acquired from the SDI printed by system 10, as described in step 114. Moreover, steps 108-110 will be carried out on the revised DI, rather than on the DI, as part of the iterative process for improving the correction of one or more registration errors.

In some embodiments, the method of FIG. 2 may terminate after completion of step 114, e.g., using a single set of registration error estimation and correction steps, so as to obtain a specified registration level of the printed digital image.

In other embodiments, the method of FIG. 2 may terminate after completion of several iterations of steps 106-114, until obtaining sufficiently high level of registration, e.g., within the specified level.

Additionally or alternatively, the method of FIG. 2 may be applied, mutatis mutandis, for correcting any other errors in image printing. For example, the method may be used for estimating and correcting a shift of a given pattern of the printed image relative to a position of the given pattern in the RDI. The method may be used for estimating and correcting a missing pattern and/or a distorted pattern, in the printed image. The method may be further used for estimating and correcting a non-uniform thickness and/or a non-uniform width, of a pattern in the printed image. Moreover, the method may be used for estimating and correcting a deviations in at least one of (a) a profile and (b) a linearity, of one or more colors of the printed image.

In other embodiments, the method may be used, mutatis mutandis, for detecting and/or estimating various types of defects, such as but not limited to (i) defects in the substrate (e.g., blanket 44 and/or sheet 50), such as a scratch, a pin hole, and a broken edge, and (ii) printing-related defects, such as irregular color spots, satellites, and splashes. Note that in such embodiments, step 112 may be replaced with identifying and repairing or replacing the malfunctioning part or station of system 10, and step 114 may be replaced with printing the DI.

Selecting and Tracking Anchor Features in Digital Images

Figure 3:
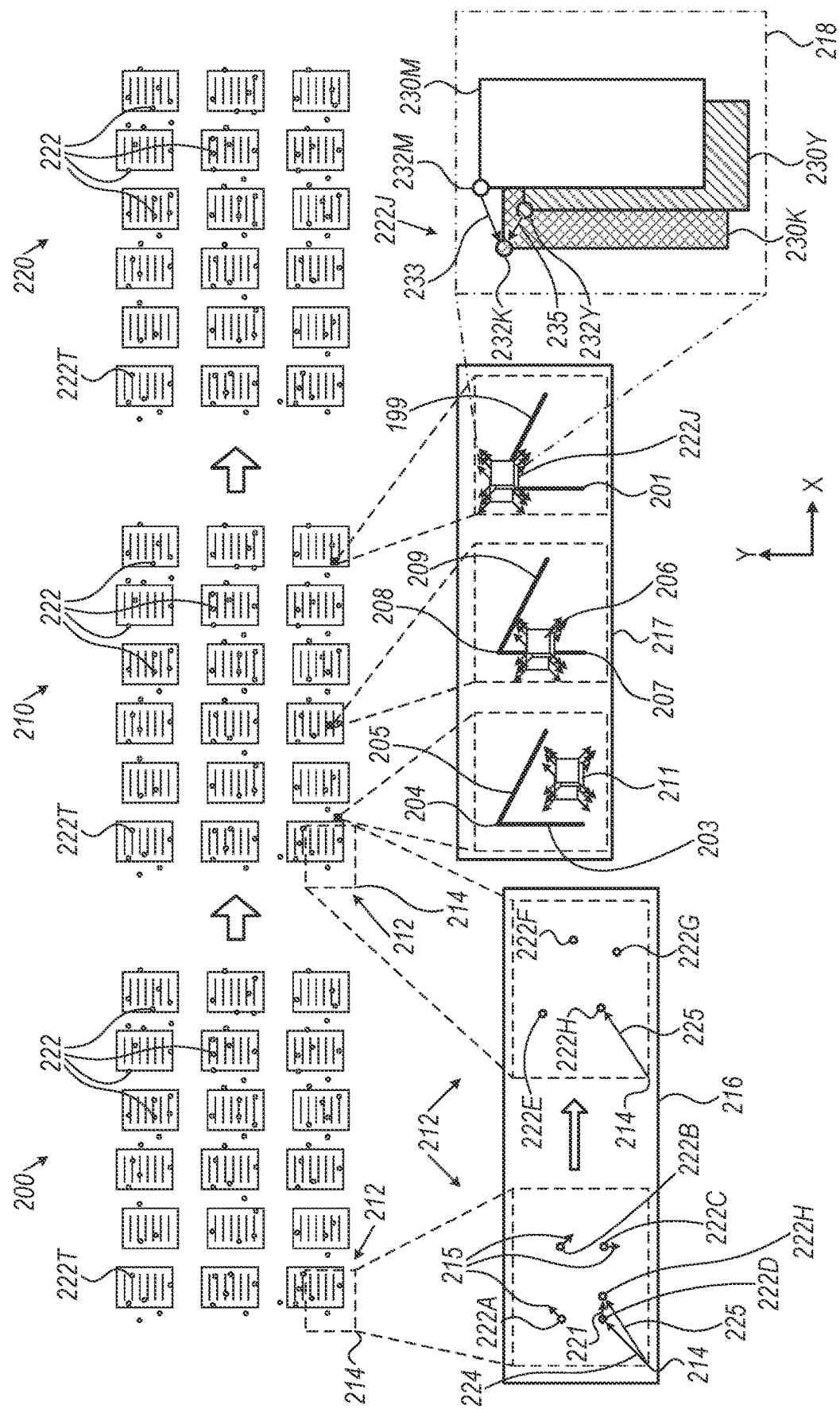
FIG. 3 is a diagram that schematically illustrates a method for selecting anchor features and estimating registration errors in digital images, in accordance with an embodiment of the present invention.

FIG. 3 is a diagram that schematically illustrates a method for selecting anchor features and estimating registration errors in digital images, in accordance with an embodiment of the present invention. FIG. 3 describes in detail embodiments of steps 104, 106 and 110 of FIG. 2 above.

In some embodiments, processor 20 receives, e.g., from an end client of an image to be printed in system 10, an RDI 200 and selects in RDI 200 one or more regions having anchor features, referred to herein as anchors 222.

As described in FIG. 2 above, in other embodiments, processor 20 may select anchors 222 from a digital image acquired from a printed image. For example, the digital image may comprise a DI 210 acquired from the first image printed in system 10, and processor 20 may select anchors 222 in DI 210 rather than in RDI 200.

In some embodiments, the selection of anchors 222 may be carried out in RDI 200 before printing a printed version of RDI 200 in system 10. In such embodiments, processor 20 may improve the productivity of system 10 by having anchors 222 already set before system 10 starts the printing process.

Reference is now made to an inset 217 showing a predefined criterion for selecting anchor 222 based on the position of a candidate anchor feature relative to a geometrical feature in the image.

In the example shown in inset 217, processor 20 may check, e.g., in RDI 200 or in DI 210, whether or not three candidate regions 205, 206 and 222J, are suitable for sensing a registration error in DI 210 and subsequent DI's acquired from respective images printed in system 10.

In some embodiments, processor 20 may produce, in candidate regions 205, 206 and 222J, multiple versions of the candidate anchor features, and may shift the candidate features in a xy plane, shown in inset 217 by arrows extending from candidate regions 205, 206 and 222J. These shifts may simulate registration errors of candidate regions 205, 206 and 222J in DI 210 and/or in the aforementioned subsequent DI's.

In an embodiment, candidate region 205 is located at a bare region, which is located sufficiently far from a corner 204 and lines 203 and 205. In this embodiment, none of the shifted versions of region 205 cross or located in close proximity to lines 203 and 205 or corner 204, therefore, candidate region 205 is not suitable for sensing a registration error, and may receive, by processor 20, a low score of a geometrical gradient.

The score of the geometrical gradient may be calculated using various types of corner detection algorithms, such as but not limited to Harris-Stephens, and Shi-Tomasi, or using any other suitable technique.

For example, processor 20 may calculate the geometrical gradients by estimating the eigenvalues of a structure tensor, which is described herein using equation (1):

$$M = \sum_{u,v=0}^{n-1} w(u, v) \begin{bmatrix} I_x^2(u, v) & I_x(u, v)I_y(u, v) \\ I_x(u, v)I_y(u, v) & I_y^2(u, v) \end{bmatrix} \quad (1)$$

wherein M denotes a structure tensor that could be defined for each point of the image, w denotes the windows that slides over the image (Box filter or Gaussian could be used), u and v denote the horizontal and vertical coordinates of the image respectively, $I_x$ and $I_y$ denote the horizontal and vertical derivatives of the image respectively In an embodiment, candidate region 206 is positioned along a line 207, but is located sufficiently far from a corner 208 and from a line 209. In this configuration, processor 20 may sense any shift of candidate region 206 along x-axis but will not sense a shift of candidate region 206 along y-axis.

In an embodiment, candidate region 222J is positioned on a corner (not shown) where lines 199 and 201 are crossing one another. In this configuration, processor 20 may sense any shift of candidate region 222J along x-axis, y-axis and any combination thereof, by returning high value of the geometrical gradient in equation (1).

In this embodiment, candidate region 222J may be suitable for sensing various types of registration errors in RDI 200, and on any digital image such as DI and 210 and DI 220, which are digital images acquired, respectively, from first and second images of RDI 200 printed by system 10.

In some embodiments, anchors 222 are selected such that they are distributed as even as possible along the digital image. For example, a frame 212 contains four regions having anchor features, referred to herein as anchors 222A, 222B, 222C, and 222D.

Reference is now made to an inset 216 having frames 212 of RDI 200 and DI 210. In some embodiments, the position of anchors 222A, 222B, 222C, and 222D may be measured relative to a predefined reference point that may be located at an edge of the image or at any other suitable distinguishable reference point of the digital image. In the example of FIG. 3, a corner 214 of frame 212 may be used as the reference point for estimating a registration error of any of anchors 222A, 222B, 222C, and 222D.

In the example of inset 216, processor 20 is configured to measure a distance 224 between corner 214 and the position of anchor 222D in RDI 200.

Reference is now made to frame 212 of DI 210 in inset 216. In an embodiment, processor 20 may detect an anchor 222H, which is the shifted position of anchor 222D, and measures in frame 212, a distance 225 between corner 214 and anchor 222H. The same process applies for anchors 222E, 222F and 222G, which are the shifted positioned of anchors 222A, 222B and 222C, respectively.

Reference is now made back to frame 212 of RDI 210 in inset 216. In some embodiments, processor 20 is configured to estimating, in the printed image of the DI, a variation of the distance measured in the image of the RDI. In the example of frame 212 of RDI 210 in inset 216, processor 20 estimates the variation between distances 224 and 225 by subtracting between the vectors of distances 224 and 225 and calculating a vector 221, indicative of the variation between distances 224 and 225.

In some embodiments, processor 20 conducts the same estimation for anchors 222A, 222B and 222C, and estimates the respective variations that are shown in inset 216 as arrows 215. Reference is now made back to the general view of FIG. 3. In such embodiments, processor 20 is configured to identify, in subsequent digital images such as DI 220, all the anchors, such as anchors 222 and 222T, selected in RDI 200 and/or DI 210, and to estimate registration errors, such as ITS registration errors, in subsequent digital images (e.g., DI 220) acquired from subsequent images printed in system 10.

Reference is now made to an inset 218, comprising three color images 230M (magenta), 230Y (yellow) and 230K (black) of candidate region 222J selected by processor 20 to be an anchor as described above in inset 217. In some embodiments, processor 20 is configured to select anchors 232M, 232Y and 232K in color images 230M, 230Y and 230K, respectively, and to calculate the color-to-color (CTC) gradient between anchors 232M, 232Y and 232K.

In some embodiments, processor 20 may calculate the CTC gradient by calculating the structure tensor of equation (1) for anchors 232M, 232Y and 232K.

In the example of inset 218, processor 20 is configured to estimate the CTC registration error between color images 230M, 230Y and 230K, by calculating distances between anchors 232M and 232K, and between anchors 232Y and 232K, shown as arrows 233 and 235, respectively.

In an embodiment, at least one of the CTC gradient and CTC registration error may be carried out using deep learning techniques, as will be described in detail in FIGS. 4-6 below.

Note that DI 210 may have some registration errors that may affect the score of the one or more selection criteria described in insets 217 and 218 above.

Estimating Registration Errors Using Deep Learning

Figure 4:
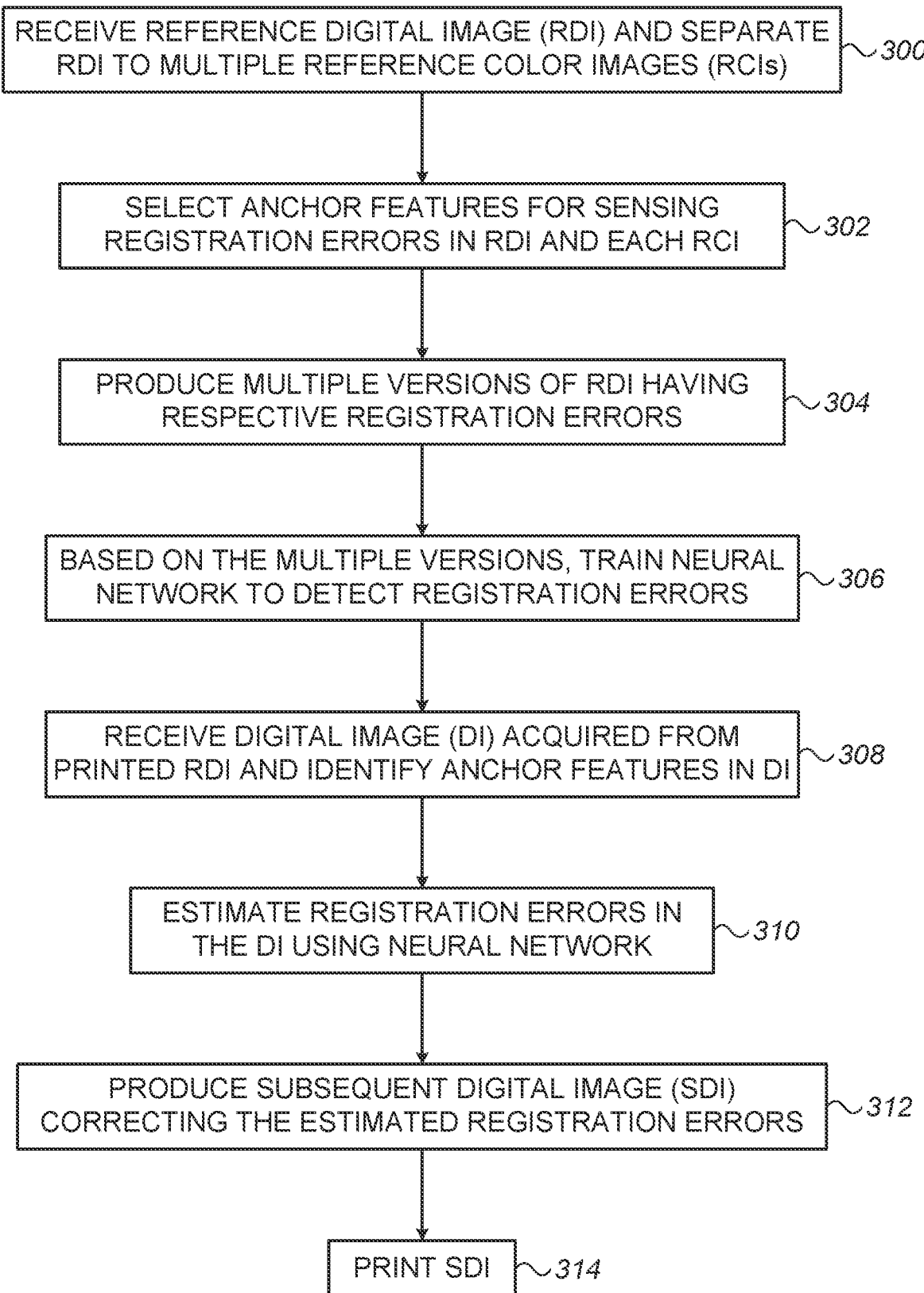
FIG. 4 is a flow chart that schematically shows a method for estimating and correcting registration errors in image printing using deep learning, in accordance with an embodiment of the present invention.

FIG. 4 is a flow chart that schematically shows a method for estimating and correcting registration errors in image printing using deep learning, in accordance with an embodiment of the present invention.

For the sake of concreteness and clarity, the method of FIG. 4 is described hereinbelow with reference to the elements of system 10. The principles of this method, however, are not limited to this particular system configuration and can be applied, mutatis mutandis, in other sorts of printing systems (such as, but not limited to digital printing on continuous web substrate) that require detection and compensation of various types of registration errors.

The method begins at a step 300 with processor 20 receiving a RDI, such as RDI 200, to be printed on blanket 44 and subsequently transferred to sheet 50 as described in FIGS. 2 and 3 above. In some embodiments, processor 20 separates RDI 200, which comprises multiple colors, to multiple RCIs of the aforementioned colors.

As described in FIG. 2 above, RDI 200 may comprise a red-green-blue (RGB) image. In some embodiments, processor 20 is configured to convert the RGB image into a combination of colors (e.g., CMYK) supplied by system 10, and is further configured to separate the image to multiple (e.g., four) color images of the respective CMYK ink droplets supplied by print bars 62, as described in FIG. 1 above.

At a step 302 processor 20 selects, based on a predefined selection criterion, one or more regions in RDI 200 and in each RCI, which are suitable for use as anchor features for sensing registration errors in the RDI and RCIs.

As described in FIG. 2 above, processor 20 is configured to select the regions having the anchor features in any type of digital image, such as but not limited to an image acquired from a printed image, or a digital image provided in any suitable format, such as but not limited to PDF file format.

At a step 304, processor 20 is configured to produce multiple versions of RDI 200 having respective registration errors. In some embodiments, processor 20 is configured to produce a version of RDI 200 by shifting an anchor feature of a RCI relative to another RCI of the same anchor feature. For example, in a given anchor feature of a RDI 200, processor 20 may shift (e.g., a few tens of microns in x and y axes) a yellow RCI relative to a black RCI. The predefined shifting of the RCI anchor features relative to one another is referred to herein as ground truth, and is depicted in detail in FIG. 5 below.

In other embodiments, processor 20 is configured to receive other suitable type of images, such as but not limited to simulated images.

At a step 306, based on the multiple versions, processor 20 is configured to train a neural network to detect registration errors, such as but not limited to CTC registration errors, which may appear for example in anchors 222 of FIG. 3 above. The architecture of the neural network, and the training process thereof are described in detail in FIGS. 5 and 6 below.

In other embodiments, processor 20 is configured to train the neural network using any other suitable type of images, such as but not limited to the aforementioned simulated images of step 304 above. In such embodiments, processor 20 may train the neural network before receiving RDI 200 and the versions thereof.

At a step 308, processor 20 receives, e.g., from image quality control station 55 or from any other image acquisition apparatus, a DI, such as DI 210 shown in FIG. 3 above. DI 210 is acquired from an image of RDI 200 that is printed by system 10. In some embodiments, processor 20 is configured to identify in DI 210, the one or more regions having the anchor features.

At a step 310, processor 20 is configured to estimate the CTC registration error in DI 210, by applying deep learning techniques to the neural network that was trained as described in step 306 above. The deep learning process and architecture of the neural network are described in detail in FIG. 6 below.

At a step 312, processor 20 produces a SDI, which is based on RDI 200 and is correcting the CTC and other registration errors estimated in DI 210, as described in step 310 above.

At a step 314, processor 20 controls system 10 to print the SDI image. In some embodiments, after step 314 the method may loop back to step 308 in an iterative process for detecting whether or not the CTC and other registration errors have been properly corrected. In such embodiments, at step 308 processor may receive, e.g., from image quality control station 55, a revised DI acquired from the SDI printed by system 10, as described in step 314.

In some embodiments, processor 20 is configured to estimate the registration error (as described in step 310 above) on the revised DI, rather than on DI 210, as part of the iterative process for improving the correction of the CTC registration error, and of other types of registration errors as described, for example, in FIG. 2 above.

In some embodiments, the method of FIG. 4 may terminate after completion of step 314, e.g., using a single set of registration error estimation and correction steps, so as to obtain a specified CTC registration level of the printed digital image.

In other embodiments, the method of FIG. 4 may terminate after completion of several iterations of steps 308-314, until obtaining sufficiently high level of CTC and other types of registration.

Additionally or alternatively, the method of FIG. 4 may be applied, mutatis mutandis, for correcting any other errors in image printing. For example, the method may be used for estimating and correcting a shift of a given pattern of the printed image relative to a position of the given pattern in the RDI. The method may be used for estimating and correcting a missing pattern and/or a distorted pattern, in the printed image. The method may be further used for estimating and correcting a non-uniform thickness and/or a non-uniform width, of a pattern in the printed image. Moreover, the method may be used for estimating and correcting a deviations in at least one of (a) a profile and (b) a linearity, of one or more colors of the printed image.

In other embodiments, the method may be used, mutatis mutandis, for detecting and/or estimating various types of defects, such as but not limited to (i) defects in the substrate (e.g., blanket 44 and/or sheet 50), such as a scratch, a pin hole, and a broken edge, and (ii) printing-related defects, such as irregular color spots, satellites, and splashes. Note that in such embodiments, (a) step 312 may be replaced with identifying and repairing or replacing the malfunctioning part or station of system 10, and (b) step 314 may be replaced with printing the DI.

Training Neural Network to Detect Registration Errors

Figure 5:
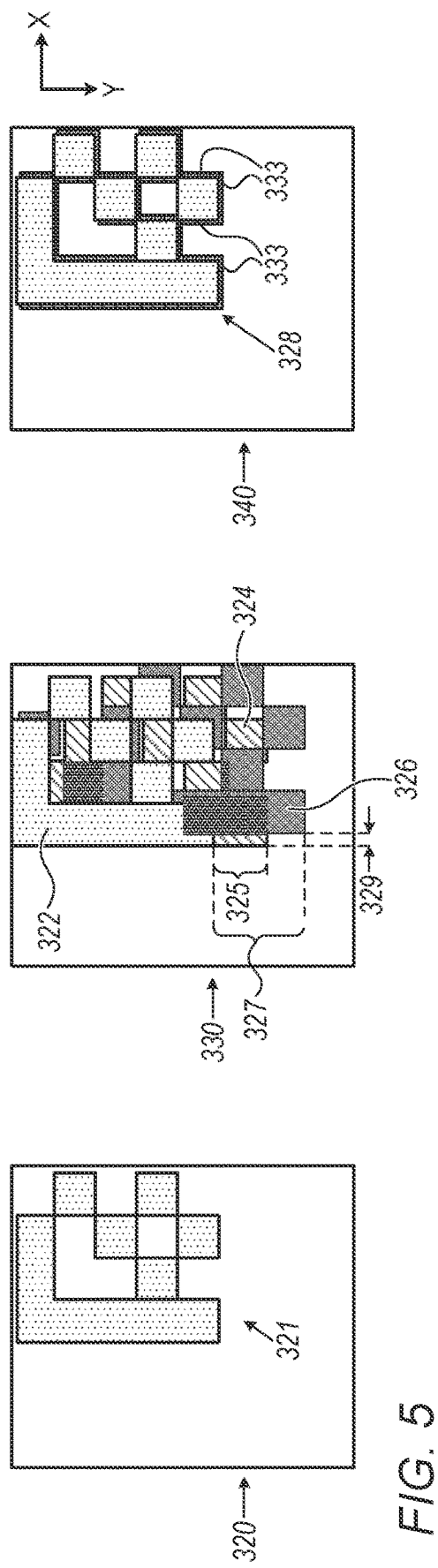
FIG. 5 is a schematic pictorial illustration showing training of a neural network for detecting color-to-color (CTC) registration errors in a patch of a reference digital image, in accordance with an embodiment of the present invention.

FIG. 5 is a schematic pictorial illustration showing training of a neural network for detecting CTC registration errors in a region 320 of RDI 200, in accordance with an embodiment of the present invention.

In some embodiments, region 320 comprises an anchor feature 321 having CMYK RCIs. Note that in RDI 200 all RCIs are aligned so that anchor feature 321 comprises a single pattern.

Reference is now made to a region 330, which is a version of region 320 of RDI 200. In some embodiments, region 330 comprises anchor feature 321 shown in a black RCI 322, a cyan RCI 324, a magenta RCI 326, and a yellow RCI, which is aligned with black RCI 322 and is therefore not shown. As described in step 304 of FIG. 4 above, processor 20 produce region 330 having the ground truth CTC registration errors by shifting RCIs relative to one another.

In the example of FIG. 5, processor 20 shifts cyan RCI 324 relative to black RCI 322, by a distance 325 of about 15 µm along y axis, and further shifts magenta RCI 326 relative to black RCI 322, by a distance 327 of about 25 µm along y axis, and by a distance 329 of about 5 µm along x axis.

In some embodiments, processor 20 applies region 330 to the neural network for training and after one or more training iterations, the neural network learns and qualifies (as will be described below) to output an estimation of the CTC registration errors in region 330.

In other embodiments, processor 20 is configured to produce any other suitable version of the registration error. Additionally or alternatively, processor 20 may apply augmented errors to the selected region having the registration error. For example, processor 20 may flip the anchor feature in x-axis and rotate the same anchor feature in y-axis. Moreover, processor 20 may blur and/or add noise to at least part of the selected region and/or anchor feature.

In the context of the present disclosure, the term "augmentation" refers to errors applied to the selected region in addition to the ground truth registration errors. This augmentation may improve the robustness of the trained neural network to detect and estimate various types of registration errors in DIs having one or more of the aforementioned augmented errors.

Reference is now made to a region 340, which is a subsequent image produced by processor 20 after correcting the CTC registration errors estimated by the neural network. As shown in the example of region 340, the neural network failed to estimate the exact (i.e., ground truth) registration errors shown as distances 325, 327 and 329, so that the pattern of an anchor feature 328 comprises CTC registration errors 333 (e.g., of a few micron) of the cyan and magenta RCIs, relative to the black RCI.

In some embodiments, processor 20 holds one or more thresholds indicative of the specified CTC registration error in x and y axes (and a combination thereof). Processor 20 is configured to detect CTC registration errors 333 in region 340 and to compare the detected CTC registration errors 333 with the aforementioned thresholds.

If CTC registration error 333 is smaller than the respective threshold, the neural network concludes the training of the neural network on the CTC registration errors applied to anchor feature 321. If CTC registration error 333 is larger than the respective threshold, the neural network has to be trained with additional examples of CTC registration errors applied to anchor feature 321.

In some embodiments, processor 20 is configured to calculate the qualification level of the trained neural network to detect CTC registration errors using a loss function. In such embodiments, the loss function is configured to calculate the difference between the ground truth and the output of the neural network. In the present example, the ground truth refers to the predetermined shift of RCIs 322, 324 and 326, shown in region 330 as distances 325, 327 and 329. The output of the neural network refers to the CTC registration errors estimated by the neural network.

In such embodiments, the loss function outputs numeric values of CTC registration errors 333 shown in region 340, and the process for obtaining the output is described in detail in FIG. 6 below.

The loss function is provided using equation (2):

$$\mathcal{L}(X,\hat{X}) = \Sigma_{i=\{c,m,y,k\}}(x_i - \hat{x}_i)^2 \quad (2)$$

wherein $\mathcal{L}(X, \hat{X})$ denotes the loss function,
c denotes the cyan color,
m denotes the magenta color,
y denotes the yellow color,
k denotes the black color,
$X=(x_c, x_m, x_y, x_k)$ denotes the ground truth CTC registration error, also referred to herein as a true color shift of the printed or simulated region, and
$\hat{X}=(\hat{x}_c, \hat{x}_m, \hat{x}_y, \hat{x}_k)$ denotes the estimated CTC registration error, also referred to herein as color shifts, predicted by the neural network.

In some embodiments, processor 20 is configured to define the true color shifts relative to one of the colors that may be selected using any suitable technique. For example, in case processor 20 selects the cyan color to serve as a reference color, then $x_c$ may equal zero and the rest of the shifts are typically scalar values other than zero. In case one or more of the RCIs are not shifted relative to the reference RCI, the true color shift may also be equal to zero. For example, if the yellow RCI is not shifted relative to the cyan RCI, then $x_y$ may also equal zero.

As described above, processor 20 holds one or more thresholds indicative of the specified CTC registration error in anchor feature 321. In some embodiments, processor 20 is configured to determine whether the neural network is qualified (e.g, sufficiently trained) to estimate, e.g., in DI 210, CTC registration errors in anchor feature 321 by comparing the output of the loss function with the aforementioned thresholds.

If the output of the loss function is smaller than the respective threshold, the neural network concludes the training of the neural network on anchor feature 321. If the output of the loss function is larger than the respective threshold, the neural network is not sufficiently trained, and processor 20 may continue training the neural network with additional examples of CTC registration errors applied to anchor feature 321.

In some embodiments, the neural network is typically trained using an iterative process, such that processor 20 feeds examples of CTC registration errors having a given ground truth and compares between the loss function and the specified level thereof. As described above, the neural network improves the estimation accuracy of the CTC registration error during the iterative process.

In some embodiments, the learning rate of the neural network is measured by the number of iterations, also referred to herein as number of epochs (#epochs), for obtaining a sufficiently-low output of the loss function (e.g., smaller than the specified threshold).

In some embodiments, each epoch may comprise any suitable number of training examples, e.g., approximately 10-100 examples. In such embodiments, the output of the loss function may be sufficiently-low after any suitable number of iterations, for example, within 500 epochs. Note that the number of examples per epoch, and the #epochs is provided by way of example, and in other embodiments, may have any other suitable numbers.

This particular use case of neural network for estimating CTC registration errors is provided by way of example, in order to illustrate certain problems, such as CTC registration errors, that are addressed by embodiments of the present invention and to demonstrate the application of these embodiments in enhancing the CTC registration performance of system 20. Embodiments of the present invention, however, are by no means limited to this specific sort of example use case, and the principles described herein may similarly be applied to other sorts of registration errors, such as but not limited to image-to-substrate registration error.

Figure 6:
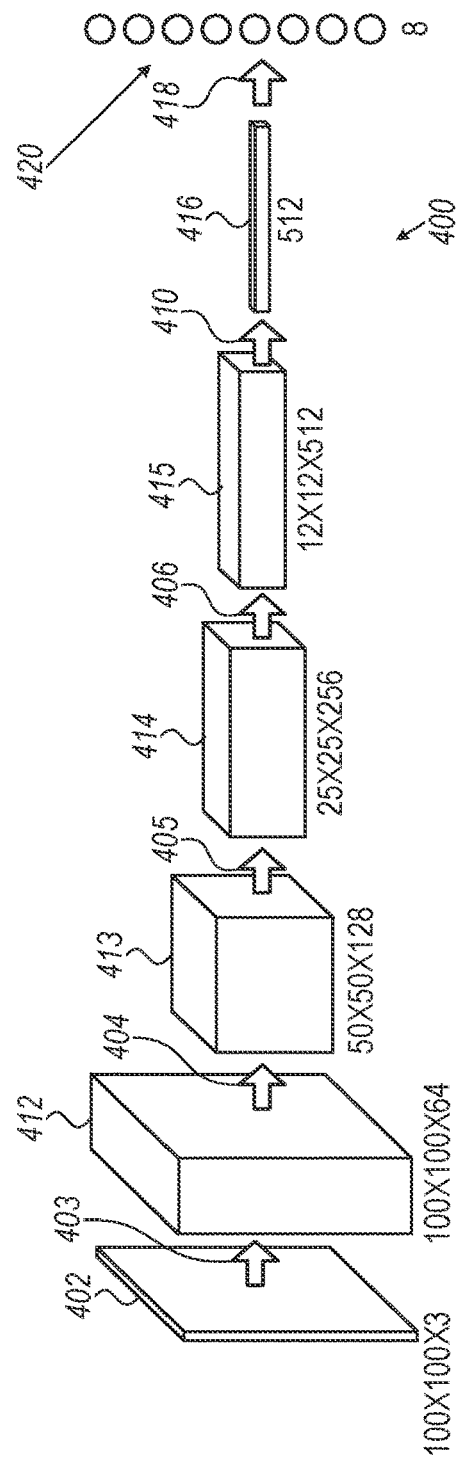
FIG. 6 is a schematic pictorial illustration of a convolutional neural network (CNN), in accordance with an embodiment of the present invention.

Deep Learning of Registration Errors Using Multi-Layered Convolutional Neural Network Architecture FIG. 6 is a schematic pictorial illustration of a convolutional neural network (CNN) 400, in accordance with an embodiment of the present invention. In some embodiments, the elements of CNN 400 may be implemented in hardware or software, or in any suitable combination thereof.

In some embodiments, processor 20 is configured to train CNN 400 for detecting and estimating registration errors, such as CTC registration errors, as described above, for example, in step 306 of FIG. 4 and in FIG. 5. After concluding the training and qualifying CNN 400 on a given set of anchor features and variations thereof, processor 20 is configured to apply CNN 400 to DI 210, as described in step 310 of FIG. 4 above and/or to any other suitable digital image comprising the given set of anchor features.

In some embodiments, CNN 400 may comprise a multi-layered convolutional neural network, each of the layers having an array of neurons, in the present example CNN 400 comprises a five-layer convolutional neural network.

In some embodiments, each neuron in CNN 400 computes an output value by applying a specific function to the input values coming from the receptive field in the previous layer. The function that is applied to the input values is determined by a vector of weights and a bias (typically real numbers). The learning process in CNN 400, progresses by making iterative adjustments to these biases and weights.

The vector of weights and the bias are referred to herein as filters of the layers and represent particular features of the input (e.g., a particular shape). A distinguishing feature of CNNs is that many neurons can share the same filter. This reduces memory footprint because a single bias and a single vector of weights are used across all receptive fields sharing that filter, as opposed to each receptive field having its own bias and vector weighting.

In some embodiments, CNN 400 is configured to receive an input 402 comprising an array of 100 by 100 weights, corresponding to the 100 by 100 pixels of the respective digital image, each of the pixels having three colors (e.g., RGB as described in FIGS. 2 and 4 above).

In some embodiments, CNN 400 is configured to apply batch normalization and max pooling (BNMP), referred to herein as a BNMP 403 to input 402, so as to accelerate learning of CNN 400. Batch normalization is a technique designed to automatically standardize the inputs to a layer in a deep learning neural network. Once implemented, batch normalization has the effect of accelerating the training process of CNN 400. In some embodiments, processor 20 is configured to add batch normalization after an activation function between a convolutional and max pooling layers, using any suitable technique. Pooling layers are configured to reduce the dimensions of the data by combining the outputs of neuron clusters at one layer into a single neuron in the next layer. The term "Max pooling" refers to pooling that uses the maximum value from each of a cluster of neurons at the prior layer.

In some embodiments, CNN 400 may apply any suitable number of BNMPs between any suitable number of the convolutional layers (CLs) thereof. In the example of FIG. 6, CNN 400 comprises CLs 412, 413, 414 and 415, and BNMPs 404, 405 and 406 are applied therebetween. As shown in FIG. 6 and will be described in detail herein, BNMP 404 is applied between CLs 412 and 413, BNMP 405 is applied between CLs 413 and 414, and BNMP 406 is applied between CLs 414 and 415.

In some embodiments, CL 412 comprises 64 filters applied to the input array of 100 by 100 weights (e.g., pixels) of input 402. Subsequently, processor 20 applies, to the output of CL 412, BNMP 404, which is configured to reduce the dimension of the data from 100 by 100 weights to 50 by 50 weights, and further applies the input of 50 by 50 weights to CL 413 having 128 filters. Subsequently, processor 20 applies, to the output of CL 413, BNMP 405, which is configured to reduce the dimension of the data from 50 by 50 weights to 25 by 25 weights, and further applies the input of 25 by 25 weights to CL 414 having 256 filters.

In some embodiments, processor 20 applies, to the output of CL 414, BNMP 406, which is configured to reduce the dimension of the data from 25 by 25 weights to 12 by 12 weights, and further applies the input of 12 by 12 weights to CL 415 having 512 filters.

In some embodiments, processor 20 applies, to the output of CL 415, batch normalization and global average pooling, referred to herein as a BNAP 410. The average pooling uses the average value from each of a cluster of neurons at the prior layer, so that in the present example, BNAP 410 is configured to convert the output tensor of CL 415 to a vector 416 of weights having, in the present example, 512 scalar numbers. In the context of the present invention, the term "flatten" refers to conversion of a multi-dimensional tensor into a one-dimensional vector.

In some embodiments, CNN 400 comprises a dense layer 418, which is configured to connect vector 416 to a fully-connected layer (FCL) 420 of CNN 400. Note that term "fully connected layer" refers to a neural network layer that connects every neuron in one layer to every neuron in another layer.

In some embodiments, during the learning process of CNN 400, at least one of, and typically all CLs 412-415, are configured to update one or more of their weights, and FCL 420 is configured to output the estimated registration error.

In some embodiments, FCL 420 may comprise multiple output numbers indicative of the registration error of each printed color in x and y axes of the printed image.

In the example of FIG. 6, FCL 420 comprises eight outputs corresponding to the registration error in x and y axes, estimated by CNN 400 for each color from among the CMYK colors. For example, the first and second outputs of FCL 420 correspond to the estimated registration error of the cyan color in x and y axes, respectively.

The configuration of CNN 400 is simplified for the sake of conceptual clarity and is provided by way of example. In other embodiments, CNN 400 may have any other configuration suitable for the training, described for example in FIG. 5 above, and for estimating the registration error in digital images acquired from printed images, such as DIs 210 and 220 shown in FIG. 3 above.

Although the embodiments described herein mainly address estimation and correction of registration errors in digital printing, the methods and systems described herein can also be used in any other types of suitable applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for correcting an error in image printing, the method comprising:
  receiving a reference digital image (RDI);
  automatically selecting, based on a predefined selection criterion comprising a score of a geometrical gradient, one or more regions in the RDI that are suitable for use as anchor features for sensing the error;
  receiving a digital image (DI) acquired from a printed image of the RDI, and automatically identifying the one or more regions in the DI;
  automatically estimating, based on the anchor features of the DI, the error in the printed image;
  calculating a correction that, when applied to the DI, compensates for the estimated error, by: (i) selecting one or more candidate regions, (ii) calculating the score for each of the candidate regions, and (iii) based on the score, selecting the one or more regions from among the candidate regions;
  correcting the estimated error in a subsequent digital image (SDI) to be printed; and
  printing the SDI having the corrected error.

2. The method according to claim 1, wherein the error comprises a registration error, which is a relative shift between two structures in the DI, and wherein the score is indicative of whether the relative shift between a given candidate region and a given structure in the DI is distinguishable for automatically estimating the registration error.

3. The method according to claim 2, wherein the relative shift is carried out in: (i) a first axis, (ii) a second axis, which is orthogonal to the first axis, and (iii) a combination of the first and second axes, and wherein automatically estimating the error comprises estimating at least one of the relative shifts.

4. The method according to claim 3, wherein the given structure comprises first and second lines crossing one another at a corner, and wherein calculating the score comprises applying a detection algorithm for detecting the corner and the first and second lines.

5. The method according to claim 4, wherein when the candidate region is positioned on the corner, calculating the score comprises detecting the relative shift in the first and second axes, and the combination.

6. The method according to claim 4, wherein when the candidate region is positioned on the first line or the second line, calculating the score comprises detecting the relative shift in at least one of the first and second axes.

7. The method according to claim 1, wherein the DI comprises first and second color images, wherein the error comprises a color-to-color (C2C) registration error, which is a relative shift between the first and second color images, wherein automatically selecting the regions comprises: (i) automatically selecting first and second color candidate regions in the first and second color images, respectively, and (ii) calculating the score by calculating a C2C gradient between the first and second color candidate regions, which is indicative of the relative shift between the first and second color images.

8. The method according to claim 7 wherein calculating the C2C gradient comprises calculating, in the geometrical gradient, a structure tensor indicative of the score.

9. The method according to claim 7, wherein calculating the C2C gradient comprises calculating at least one of: (i) a distance between the first and second color candidate regions, and (ii) a variation in the distance between the first and second color candidate regions.

10. A system for correcting an error in image printing, the system comprising:
  a processor, which is configured to:
    receive a reference digital image (RDI);
    automatically select, based on a predefined selection criterion comprising a score of a geometrical gradient, one or more regions in the RDI that are suitable for use as anchor features for sensing the error;
    receive a digital image (DI) acquired from a printed image of the RDI, and automatically identify the one or more regions in the DI;
    automatically estimate, based on the anchor features of the DI, the error in the printed image; calculate a correction that, when applied to the DI, compensates for the estimated error by: (i) selecting one or more candidate regions, (ii) calculating the score for each of the candidate regions, and (iii) based on the score, selecting the one or more regions from among the candidate regions; and
    correct the estimated error in a subsequent digital image (SDI) to be printed; and
  a printing subsystem configured to print the SDI having the corrected error.

11. The system according to claim 10, wherein the error comprises a registration error, which is a relative shift between two structures in the DI, and wherein the score is indicative of whether the relative shift between a given candidate region and a given structure in the DI is distinguishable for automatically estimating the registration error.

12. The system according to claim 11, wherein the relative shift is carried out in: (i) a first axis, (ii) a second axis, which is orthogonal to the first axis, and (iii) a combination of the first and second axes, and wherein the processor is configured to estimate at least one of the relative shifts.

13. The system according to claim 12, wherein the given structure comprises first and second lines crossing one another at a corner, and wherein the processor is configured to calculate the score by applying a detection algorithm for detecting the corner and the first and second lines.

14. The system according to claim 13, wherein when the candidate region is positioned on the corner, the processor is configured to calculate the score by detecting the relative shift in the first and second axes, and the combination.

15. The system according to claim 13, wherein when the candidate region is positioned on the first line or the second line, the processor is configured to calculate the score by detecting the relative shift in at least one of the first and second axes.

16. The system according to claim 10, wherein the DI comprises first and second color images, wherein the error comprises a color-to-color (C2C) registration error, which is a relative shift between the first and second color images, wherein the processor is configured to automatically select the regions: (i) by automatically selecting first and second color candidate regions in the first and second color images, respectively, and (ii) calculate the score by calculating a C2C gradient between the first and second color candidate regions, which is indicative of the relative shift between the first and second color images.

17. The system according to claim 16, wherein the processor is configured to calculate the C2C gradient by calculating, in the geometrical gradient, a structure tensor indicative of the score.

18. The system according to claim 16, wherein the processor is configured to calculate the C2C gradient by calculating at least one of: (i) a distance between the first and second color candidate regions, and (ii) a variation in the distance between the first and second color candidate regions.

* * * * *